United States Patent

Schouw

[15] 3,678,659
[45] July 25, 1972

[54] PRIMARY COLLECTOR AND MANIFOLD

[72] Inventor: Arthur C. Schouw, 700 S. McMillan St., Owosso, Mich. 48867

[22] Filed: Sept. 10, 1969

[21] Appl. No.: 856,656

[52] U.S. Cl. ............................55/238, 55/466, 261/79 A, 261/116
[51] Int. Cl..................................................B01d 47/06
[58] Field of Search............261/79 A, 116; 55/237, 238, 55/257, 466

[56] References Cited

UNITED STATES PATENTS

| | | | |
|---|---|---|---|
| 2,281,254 | 4/1942 | Anthony, Jr. | 261/79 A |
| 3,315,444 | 4/1967 | Seversky | 261/79 A |
| 3,334,470 | 8/1967 | Hupke | 261/116 X |

FOREIGN PATENTS OR APPLICATIONS 256,889  8/1926  Great Britain ......................261/79 A Primary Examiner—Frank W. Lutter
Assistant Examiner—Steven H. Markavitz
Attorney—Miller, Morriss, Pappas & McLeod

[57] ABSTRACT

A primary collector for separators in which a manifold is located on the intake side of a separator and in the induced flow to the separator. Tangential entries are provided into the cylindrical manifold to achieve a swirling entrainment. Selected scrubbing provisions are provided and an axial drain allows removal of separated material.

3 Claims, 4 Drawing Figures

Patented July 25, 1972

3,678,659

INVENTOR
ARTHUR C. SCHOUW
BY
Miller, Morris, Pappas & McLeod
ATTORNEYS

PRIMARY COLLECTOR AND MANIFOLD

The present invention comprises a primary collector for scrubbers or separators which is of the manifold type and is located intermediate the separator and the source of collected gases and/or vapors and entrained solids or liquids. More particularly the primary collector of the present invention provides a pretreatment or primary treatment chamber which admixes gases or vapors in swirling tangential manner from several sources, accomplishes a primary removal of contaminant liquids, vapors, or solids and preconditions the gases and or vapors by induced swirling to move into the secondary treatment phase.

The result of the claimed structure is to increase the total capacity of a given separator or scrubber while providing a manifold ducting flow from plural sources, as for example oil baths, to a common introduction to a secondary treatment unit. This provides a beneficial removal phase prior to introduction to a separator.

Accordingly, the principal object of the present invention is to provide a simple primary collector which is attachable ahead of entry to a scrubber or separator.

Another object is to provide a manifold for plural duct entries in which the ducting into the manifold converts the manifold into a primary treatment chamber capable of materially reducing the total entrained contaminants in gases and/or vapors passed into a secondary removal phase.

Another object is to teach the construction of a manifold wherein electrostatic removal and particle impingement concepts of separation are joined with pressure or velocity change phenomena to accomplish effective primary separation.

Other objects including simplicity of maintenance and installation will be appreciated by those skilled in the Separator and Scrubber art as the description proceeds. The device contains no moving parts.

In the prior art of separators and scrubbers, a single separator or scrubber may contain plural separation phases through which, in a single structure gases, vapors and their contaminants are subjected to a variety of removal treatments. These are usually in a single cartridge but contaminated gases may be collected and delivered to the entry from plural machine sources. For example these might be serving a plurality of different treatment tanks and the gases and vapors from the treatment is picked up by hoods and delivered to the scrubbers or separators by ducting. Such devices are seen in the prior art for example, of U.S. Letters Pat. Nos. 1,682,285 to keith; 3,273,317 to Vicard; 3,399,134 to Huppke. The present structure is intended to be adaptable to anyone of these units and prior to entry thereto. More particularly the present invention is designated to complement my own separator unit expressed and disclosed in my copending application for U.S. Letters Patent, Ser. No. 771,490 filed on 1968 Oct. 29.

GENERAL DESCRIPTION

In general the structure of the present invention comprises a cylindrical casing having an axial opening through the top with provision for coaxial attachment to a separator entry. Tangential lead-ins or entries are provided through the casing. The floor or bottom of the cylindrical casing includes a drain, preferably on the axis of the cylindrical casing with provision for removal of liquids and/or solids or mixtures thereof. Nozzles of the spray type are provided in or through the casing, the nozzles being generally directed in concurrent direction with the tangential flow of entrant gases or vapors. Hence the nozzles themselves are disposed or directed tangentially and on the upstream side of said tangential lead-ins. The tangential lead-ins or entries are in fact conduit nipples which are then connectable to ducting leading from plural sources of air contamination, such as plating baths, machine tools, oil baths, or the like.

The primary collector is fabricated from resin material selected to complement an electrostatic removal of particles in the influent gases or vapors. The material is selected may be poly vinyl chloride, nylon, or the like each having a different charging affinity consequent to the movement of the gases, vapors, or entrained particles so that a portion of the removal efficiency of the primary collector is attributable to electrostatic phenomena. The collector of the present invention, when connected to a secondary and/or tertiary treatment structure is on the vacuum or low pressure induced flow stream of the secondary and/or tertiary unit. This is usually a fan or blower which is a part of the duct system or integral in the secondary and tertiary equipment. As will be obvious, the size of the primary collector is related to the size of secondary and tertiary equipment and adjusted to the volume of throughput.

IN THE DRAWINGS

Figure 1:
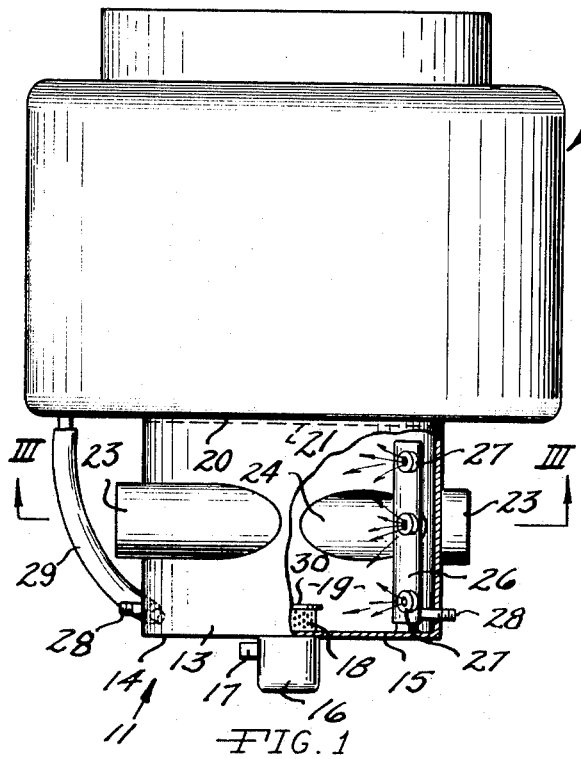
FIG. 1 is a partially broken away elevation view of a primary collector in accord with the present invention and coaxially affixed to a secondary and tertiary separator or scrubber unit.
Figure 3:
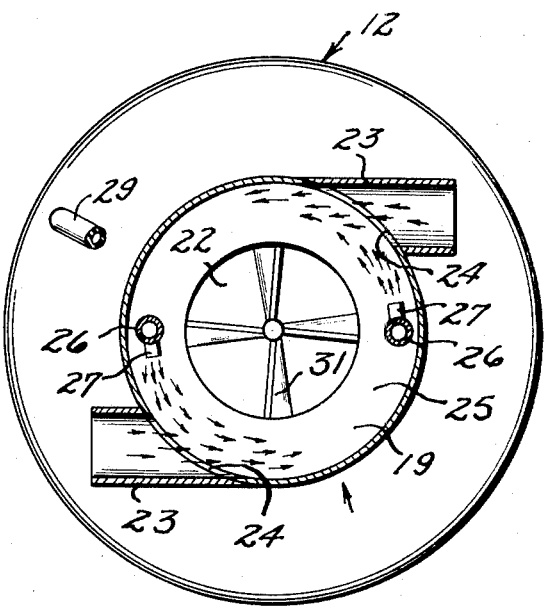

FIG. 3 is a cross section view taken on the line III—III of FIG. 1 and indicating the tangential entries to the chamber formed by the primary collector and manifold and indicating the swirling tangential flow within the chamber prior to being sucked into the blower of the secondary and tertiary treatment unit. This FIG. 3 also reveals the preferred complementing location of the nozzles for generation of larger particles.

Figure 2:
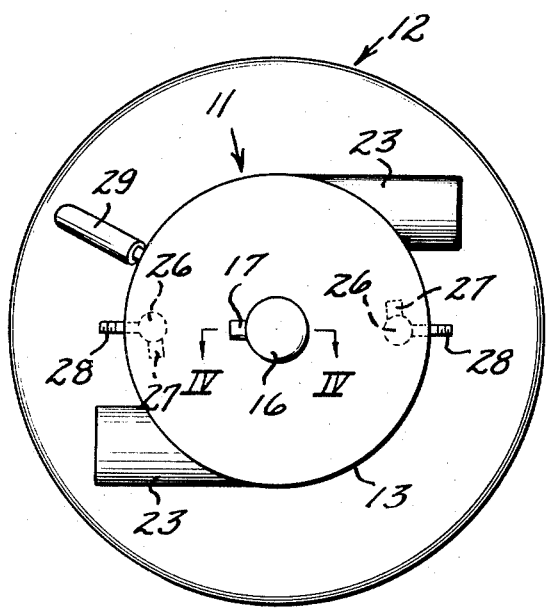
FIG. 2 is a bottom plan view of the structure seen in FIG. 1 and indicating nozzle orientation within the chamber of the primary collector.
Figure 4:
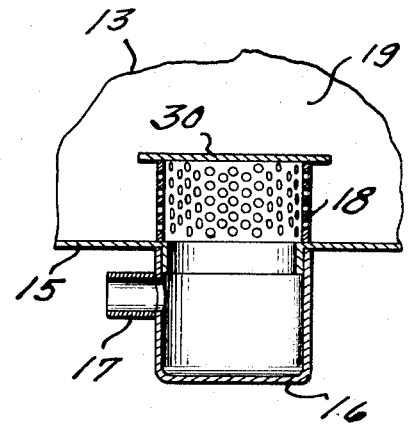

FIG. 4 is a cross section partial elevation view taken on the line IV—IV of the FIG. 2 and indicating the axially positioned screened trap and gravity drain, and illustrates the top plate on the trap.

SPECIFIC DESCRIPTION

The primary collector and manifold 11 of the present invention is best appreciated operatively secured in relationship to second and/or tertiary separator treatment apparatus 12. The primary collector 11 is made up of a cylindrical casing 13 which is closed at the bottom 14 by an annular plate 15 closing on a trap unit 16 through the bottom 14 on the axis of the casing 13 and having a drain nipple 17 extending therefrom. The trap 16 internally and axially extends to include a screen entry 18 extending into the chamber 19 formed by the casing 13. The upper end 20 of the casing 13 is over a flange 21 of a duct entry 22 to the secondary and tertiary treatment apparatus 12. (The duct entry 22 is best seen in FIG. 3). Thus the primary and collector manifold 11 may be clamped, welded or otherwise secured to flanged ducting so that flow through the collector 11 is axial with the vortex of flow in the collector 11 and on the axis of the casing 13.

A plurality of collector nipples 23 are secured to and through the casing 13 so that flow entry to the chamber 19 is tangential in character. Since the nipples 23 are tubular their connection through the walls of the casing 13 is substantially elliptical and the elliptical entries 24 are complementary to each other as the tangentially entering material impinge and are swirled by that impingement against the internal vertical cylindrical walls of the chamber 19.

An annular apron 25 which may be a part of the secondary and tertiary treatment apparatus 12 defines an upper constriction to the entry 22 to the secondary and tertiary apparatus 12. Spray tube elements 26 are located within the chamber and include one or more nozzle elements 27. The nozzles are located on the upstream side of the elliptical openings 24 and are directed for concurrent tangential flow across the openings so as to accomplish, where desired, an entrainment of, say, liquid particles in the flow of incoming gases or vapors. The sense or direction of the liquid particles thus added complements the flow direction of the influent materials through the nipples 23.

The nozzles 27 are fed through the spray tubes 26 by means of pipe 28 through the walls of casing 13. Feed may be by collector tube 29 using materials arriving in the sumps of the apparatus 12 under gravity and pressure generated in the apparatus 12, or where desired the sprays may be supplied by auxiliary pumps (not shown) through separate conduits to the pipes 28.

It has been found that a disc-like cover plate 30 is desirable as a cover on the screen element 18. The cover plate 30 is position transverse of the axis of the case and parallel to the bottom plate 15 and in spaced relation upward from the bottom plate. This is better seen in reference to FIG. 4.

In FIG. 2 the tangential entry of the nipples 23 to the case 13 is best appreciated and the tangential orientation of the nozzles 27 is readily understood. In addition the collector tube 29 is shown in communicating flow relationship between the secondary and tertiary apparatus 12 and the primary collector 11. Under certain circumstances of pressure the collector tube 29 may be connected to the pipes 28 or as previously described, the pipes 28 may be connected to a pump circulating the collected liquids, for example.

The nipples 23 provide connections to suitable ducting (not shown) which serve plural pieces of machinery or apparatus generating objectionable contaminating vapor. An example might be oil vapor generating processes and in such instances collector hoods gather the contaminated gases, pass them through the ducting and nipples 23 and into the primary collector 11. Thence, the gases may move into secondary and tertiary treatment apparatus.

In FIG. 3 the fan 31, usually a part of the secondary and tertiary apparatus is visible. The fan or blower 31 draws the gases and/or vapors to be treated through the ducting and nipples as previously described and into the chamber 19. The described orientation of the entry nipples 23 causes the gases and/or vapor to tangentially swirl into the chamber 19 confined and directed by the walls of the casing 13 and confined at the bottom by the closure 15 and chocked by the annular apron 25. The spray tubes 26 project into the chamber 19 on the upstream side of the entries 24 and the spray nozzles 27 are also arranged to accomplish tangential flow across the entries 24 so that particles may be entrained in the influent gases aiding in separation by providing a particle size having an affinity for the vapors or gases contaminating the influent material. The arrows indicate the flow directions of the spray and influent gases. Since the flow of both is complementary a swirling occurs providing an initial centrifugal removal of particles. Impingement with the resin walls in combination with flow movement provides an electrostatic removal. The abrupt volume change or pressure drop brought about by the presence of the primary collector manifold 11 also assists in separation prior to vortexial entry to the secondary and tertiary treatment apparatus 12 and these factors are merged in the described structure to accomplish a substantial stripping of contaminants. The gases and/or vapors pass onward to further treatment and the liquids or particulate solids drop out into the bottom of the chamber 19 and flow into the trap 16 for removal through the drain 17. A foraminous material such as a resin screen having selected size openings therethrough caps and trap 16 and the disc cover 30 provides a non-interfering plane separator on the axis of the generated vortex.

The device of the present invention provides an excellent collector manifold for separator units serving plural operational sites. In addition, it accomplishes a very substantial removal which contributes to upgrading of effluent from separator-scrubber equipment and hence permits better and more efficient removal of contaminants and/or an increase in the throughput capacity of a given secondary and tertiary piece of equipment.

While the device is simple it fully exploits on a primary treatment basis the following filtering, scrubbing, separating, concepts: (a) particle impingement and affinity (b) centrifugal separation (c) electrostatic precipitation (d) abrupt volume change and pressure drop.

Having thus described my invention, other skilled in the art will readily appreciate improvements and modifications therein. Such modifications and improvements are intended to be included herein limited only by the scope of the hereinafter appended claims.

I claim:

1. A primary collector for separators comprising:
    a cylindrical casing having a bottom and an open upper portion and a peripheral attachment flange thereabout for securing said casing in coaxial relation to a separator;
    a drain coaxial with said open upper portion of said cylinder and through the bottom of said cylinder;
    a screened trap in said drain;
    a horizontal plate against said screen transverse of the axis of said primary collector;
    plural tangential nipples through the side walls of said cylinder and disposed between the top and bottom thereof whereby influent vapors and air are swirlingly entrained;
    at least one primer spray head with nozzles and vertically positioned in said cylinder and having the nozzles thereof pointed in the direction of vapor flow and on the upstream side of said nipples; and
    a conduit for second secondary liquid entering said cylinder proximate to the bottom thereof.

2. A primary collector and manifold for separators, scrubbers and the like comprising:
    a cylindrical casing defining a treatment chamber therein closed at the bottom by a bottom plate and choked at the top by an annular apron;
    a plurality of nipples tangentially through said casing;
    a plurality of nozzles in said chamber formed by said casing and arranged upstream of said nipples and aimed tangentially with respect to said casing to complement the flow resulting from said tangentially disposed nipples;
    a screened trap coaxially positioned in the said casing and axially extending through the bottom thereof including a strainer extending cylindrical from said bottom, a drain opening, and a disc cover resting on said strainer;
    said cover in spaced relation above said trap and in a plane transverse to the axis of said chamber.

3. In the structure of claim 2 wherein substantially all elements described therein are of resin material selected and matched to the separation sought to be accomplished in accord with electrostatic affinities.

* * * * *